(12) United States Patent
Dillon

(10) Patent No.: US 7,003,360 B1
(45) Date of Patent: Feb. 21, 2006

(54) SYSTEM AND METHOD FOR PRODUCT CONFIGURATION USING NUMERICAL CLAUSES AND INFERENCE PROCEDURES

(75) Inventor: Thomas H. Dillon, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 413 days.

(21) Appl. No.: 10/171,011

(22) Filed: Jun. 12, 2002

(51) Int. Cl.
*G06F 19/00* (2006.01)

(52) U.S. Cl. .......................... 700/97; 700/103; 700/49; 706/46

(58) Field of Classification Search ............ 700/47–50, 700/103, 97; 706/8, 45, 46, 57, 62
See application file for complete search history.

(56) References Cited

U.S. PATENT DOCUMENTS

| | | | |
|---|---|---|---|
| 5,515,524 A | 5/1996 | Lynch et al. ................ 395/500 |
| 5,596,682 A * | 1/1997 | Yamazaki .................... 706/56 |
| 5,636,328 A * | 6/1997 | Kautz et al. .................. 706/45 |
| 5,708,798 A | 1/1998 | Lynch et al. ................ 395/500 |
| 5,825,651 A | 10/1998 | Gupta et al. |
| 6,002,854 A | 12/1999 | Lynch et al. ........... 395/500.01 |
| 6,078,946 A * | 6/2000 | Johnson ...................... 709/200 |
| 6,405,308 B1 | 6/2002 | Gupta et al. .................... 713/1 |
| 6,556,978 B1 * | 4/2003 | Ginsberg et al. ............. 706/19 |

OTHER PUBLICATIONS

Cadoli, Marco, Donini, Francesco M.; A Survey on Knowledge Compilation, AI Communications, pp. 1-14.
Uribe, Tomás E., Stickel, Mark E.; Ordered Binary Decision Diagrams and the Davis-Putnam Procedure, pp. 1-21.
Zhang, Hantao, Stickel, Mark E.; Implementing the Davis-Putnam Algorithm by Tries, pp. 1-16.
Bryant, Randal E., Binary Decision Diagrams and Beyond: Enabling Techniques for Formal Verification, Carnegie Mellon University, Pittsburg, PA 15213.

(Continued)

*Primary Examiner*—Leo Picard
*Assistant Examiner*—Sean Shechtman
(74) *Attorney, Agent, or Firm*—Hamilton & Terrile, LLP; Kent B. Chambers

(57) ABSTRACT

A system and method for product configuration represents a product using a configuration model having numerical clauses. Features of the product are associated with literals in the numerical clauses. The numerical clauses may specify a number of literals to determine whether the numerical clause is satisfied, satisfiable, or unsatisfiable. Numerical clauses represent constraints that govern the configuration of the product. Resolving numerical clauses and user choices involves one or more inference procedures. In one embodiment, unit clauses represent user choices, and a configuration engine asserts the unit clause and performs numerical unit resolution between the unit clause and all numerical clauses containing the complement (generally a negation) of the unit clause. Complementary literals are eliminated from the current state of the configuration model. In one embodiment, if the uneliminated literals in a numerical clause causes the clause to be satisfied, the uneliminated literals are recursively asserted. The configuration engine then performs numerical unit resolution between the recursively asserted, uneliminated literals and numerical clauses containing the complements of the uneliminated literals. Numerical clauses may also function as literals. Numerical clauses may include negations of consumer literals and positive provider literals. If a user chooses a consumer feature, by knowing the consumer and provider weights, the configuration engine can determine which provider literals should be included, excluded, or remain selectable. Embodiments of the invention can implement a logic-based truth maintenance system and numerical unit resolution.

55 Claims, 5 Drawing Sheets

OTHER PUBLICATIONS del Val, Alvaro; Tractable Databases: How to Make Propositional Unit Resolution Complete through Compilation, Stanford University, Stanford CA 94035.

McAllester, David; "Truth Maintenance," Massachusetts Institute of Technology.

Murray, Neil V., et al.; "The Semi-Resolution Inference Rule and Prime Implicate Computations".

Ibaraki, Toshihide, et al.; "Functional Dependencies in Horn Theories," pp. 1-40.

* cited by examiner

US 7,003,360 B1

SYSTEM AND METHOD FOR PRODUCT CONFIGURATION USING NUMERICAL CLAUSES AND INFERENCE PROCEDURES

BACKGROUND OF THE INVENTION

1. Field of the Invention

The present invention relates in general to the field of information processing, and more specifically to a system and method for product configuration using efficient product representation and configuration logic processing procedures.

2. Description of the Related Art

A configurator is a software tool used to assist customers and sales persons in finding and ordering valid configurations of complex products. A configurator can also be used for other purposes, such as for correctly specifying products during manufacturing. Such products may have many selectable features and options subject to compatibility or other configuration constraints. The configurator is given a configuration model (sometimes called a knowledge base), which identifies the set of features defining the configuration space, and the set of combinations of features that correspond to valid configurations. Typically the set of valid configurations is not described extensionally. Rather, the configuration model uses a special-purpose declarative language with primitives chosen for their ability to express configuration logic concisely and maintainably.

Given a configuration model, the configurator interactively assists users in finding valid configurations that meet their needs. More specifically, the user interacts with the configurator, selecting desired product features one by one. After each new choice the configurator's core task is generally to find:

All features that are incompatible with the user's selections. A given feature is incompatible with the user's selections if there exists no valid configuration that contains both the user's selections and the given feature.

All features that are required by the user's selections. A given feature is required by the user's selections if every valid configuration that contains the user selections also contains the given feature.

By providing feedback to the user showing which features are incompatible with, or required by, previous selections, the configurator makes it possible for the user find valid configurations without having to backtrack or search.

Note that the configurator typically performs other tasks as well. For example, it may generate explanations of how it reached its conclusions, it may determine which selections need to be retracted in order to select a feature that is currently excluded, and it may search for optimal or default configurations consistent with some partial set of user selections. Nevertheless, the task above remains the core task of the configurator because it typically plays a key part in algorithms for implementing other tasks.

The core configuration task we have described above is essentially the task of consequence finding. A natural way to approach it is to translate the configuration model into an expression of propositional logic and then treat the problem as one of propositional entailment:

Let M be the clausal database obtained by translating the configuration model into an expression of propositional logic in conjunctive normal form (CNF), i.e. a conjunction of clauses, of which each is a disjunction of literals.

Let U be a set of unit clauses representing user selections. (a unit clause is a clause containing a single literal).

The core configuration task is then to find every unit clause, C, where $M \wedge U \models C$, wherein "$\models$" is the symbol for entailment.

One way to find all entailed unit clauses is to use a resolution-based consequence-finding algorithm such as Tison's prime implicates algorithm. Recall that resolution is an inference procedure whereby two parent clauses, C1 and C2, containing complementary literals, a and ¬a, may be combined to produce a resolvent clause, R, containing the union of the literals of the parent clauses minus the complementary literals resolved upon. That is, $$C1 = \{a, b_1, \ldots, b_n\}$$
$$C2 = \{\neg a, c_1, \ldots, c_n\}$$
$$\overline{R = \{b_1, \ldots, b_n, c_1, \ldots, c_n\}}$$

General resolution is both sound and complete. Unfortunately, because a resolvent can include more literals than either of its parents, and thus may not subsume either parent, the number of clauses in the database can grow exponentially. Indeed, consequence finding with general resolution is NP-hard, and algorithms based on general resolution are not normally suitable for interactive systems where responsiveness is a key requirement.

The usual compromise is to use unit resolution, an incomplete inference procedure that may not find all entailed conclusions, but that is guaranteed to run in time linear in the number of literals in the database. Unit resolution is a restricted form of resolution that considers only resolutions where one of the parent clauses is a unit clause. For example:

$$\{a, b_1, \ldots, b_n\}$$
$$\{\neg a\}$$
$$\overline{\{b_1, \ldots, b_n\}}$$

Unit resolutions always produce resolvents that subsume their non-unit parents, thereby reducing the number of literals in the database by one. This being the case, the maximum number of unit resolutions that can ever be performed is equal to the number of literals in the database, and the cost of unit resolution is linear in the database size. This linear bound on the cost of unit resolution is an attractive characteristic and is generally worth the loss of completeness, especially since there are a number of techniques that can be used to compile a model into a form where the incompleteness disappears.

Translation of the configuration model into CNF and application of unit resolution would therefore seem to be a reasonable approach for solving the core configuration task.

Unfortunately, a significant practical problem arises when this process is applied to real configuration models. Recall that configuration models are typically written in special languages with primitives designed for expressing configuration logic concisely and maintainably. These configuration primitives can be translated into propositional logic, but conciseness of representation is usually lost along the way. In practice, these translations can lead to exponential growth in the size of the model's representation. In such cases, unit resolution's promise of linear performance becomes an empty one. Though the cost of inference remains linear with respect to the size of the translated model, it may be exponential with respect to the size of the original model.

As an example, consider the following case of 'exclusive choices'.

A common constraint in configuration modeling is "you must choose exactly one member of this set", or more generally, "you must choose at least A and at most B members of this set", where A and B are nonnegative integers, and B≧A. This sort of (A,B) choice has no concise representation in propositional logic.

For example, suppose a model includes five colors represented by the variables a, b, c, d, and e, as well as the constraint "you must choose exactly one color". This constraint can be split into two separate constraints: (1) "you must choose at least 1 color" and (2) "you must choose at most 1 color".

Constraint (1) can be written simply as a single conventional clause:

{a, b, c, d, e}

However, constraint (2) must be represented by a series of conventional clauses, one for each pair of colors that can't be selected together:

{¬a, ¬b}
{¬a, ¬c}
{¬a, ¬d}
{¬a, ¬e}
{¬b, ¬c}
{¬b, ¬d}
{¬b, ¬e}
{¬c, ¬d}
{¬c, ¬e}
{¬d, ¬e}.

In general, if N is the number of features in the set and A is the minimum that must be chosen and B is the maximum that must be chosen, then representing the choice in conventional propositional logic requires . . .

$$\binom{N}{N-A+1}$$

clauses expressing the minimum constraint, and . . .

$$\binom{N}{B+1}$$

clauses expressing the maximum constraint, where expressions of the form . . .

$$\binom{N}{M}$$

represent "N choose M", i.e., the number of ways to choose M elements from a set of N. Mathematically, "N choose M" is defined as N!/(M!(N−M)!), a function that can grow exponentially with N.

As Table 1 illustrates, if the minimum, A, and maximum, B, are both one, then the number of clauses in a CNF representation of the choice grows quadratically with respect to N. With arbitrary minimums and maximums the number of clauses grows much faster, with the worst case being a minimum or maximum equals to N/2.

TABLE 1

| Choices | A - Minimum Number | B - Maximum Number | Minimum Clauses | Maximum Clauses |
|---|---|---|---|---|
| 5 | 1 | 1 | 1 | 10 |
| 10 | 1 | 1 | 1 | 45 |
| 20 | 1 | 1 | 1 | 190 |
| 20 | 2 | 18 | 20 | 20 |
| 20 | 5 | 15 | 4845 | 4845 |
| 20 | 10 | 10 | 167960 | 167960 |

The growth encountered when translating the "exclusive choices" configuration constraint into propositional logic illustrates that a guarantee of linear performance with respect to the size of a model in CNF is far from a guarantee of linear performance with respect to its size in its original form (using the min/max choice primitive). From Table 1 we see that a rule stated as simply as "you must choose exactly ten of these twenty things" would have a CNF representation with 335,920 clauses containing a total of 3,695,120 literals.

As another example, consider the following case of 'resource constraints'.

Another common configuration primitive is the resource constraint. Certain components are identified as providers of a given resource and other components are identified as consumers of the resource. The resource constraint states that the amount of resource provided by selected providers must equal or exceed the amount of resource consumed by selected consumers.

For example, suppose we have a power resource and the following providers and consumers as depicted in Table 2:

TABLE 2

| Provider | Power units provided | Consumer | Power units consumed |
|---|---|---|---|
| PowerSupply1 | 100 | HardDrive1 | 50 |
| PowerSupply2 | 200 | HardDrive2 | 150 |
|  |  | HardDrive3 | 150 |

Given these resources, Table 3 is an example of the consequences of selecting different combinations of hard drives, where 'user-selected' indicates a user selection, 'INCLUDED' indicates a feature required by the user selections, 'EXCLUDED' indicates a feature incompatible with the user selections, and '--', indicate a feature that may validly be selected or left out.

TABLE 3

| HardDrive1 | HardDrive2 | HardDrive3 | Power-Supply1 | Power-Supply2 |
|---|---|---|---|---|
| user-selected | — | — | — | — |
| — | user-selected | — | — | INCLUDED |
| — | — | User-selected | — | INCLUDED |
| user-selected | user-selected | EXCLUDED | — | INCLUDED |
| user-selected | EXCLUDED | User-selected | — | INCLUDED |
| EXCLUDED | user-selected | User-selected | INCLUDED | INCLUDED |

Table 4 is an example of the consequences of user-excluding power supplies in conjunction with selecting hard drives ('user-excluded' means that the user has indicated that the given feature must not be included in the configuration).

TABLE 4

| HardDrive1 | HardDrive2 | HardDrive3 | Power-Supply1 | Power-Supply2 |
|---|---|---|---|---|
| — | EXCLUDED | EXCLUDED | — | Excluded |
| — | user-selected | EXCLUDED | user-excluded | INCLUDED |

Because resource-oriented logic is fundamentally about summing and comparing quantities, it is neither convenient nor efficient to represent prepositionally. Representing resource-oriented logic prepositionally involves finding every possible combination of selected resource consumers and excluded resource providers that violates the resource constraint and writing a rule to exclude that combination. If P and C are the numbers of providers and consumers respectively, then there are $2^{(P+C)}$ possible combinations of selected consumers and excluded providers. Of these a subset may violate the constraint, and of those a subset may be eliminated via subsumption. Nevertheless, the sets of clauses representing the combinations are exponential in size and the representational growth we encounter may be dramatic.

SUMMARY OF THE INVENTION

Embodiments of the present invention provide methods for representing configuration logic and reasoning with the logic in ways that offer the same computational benefits as unit resolution without suffering the representational growth and resulting performance degradation that attend a direct translation of the logic into CNF.

In another embodiment of the present invention, a method of configuring a product using a configuration model having a conjunction of numerical clauses representing configuration constraints, wherein each numerical clause includes (i) a set of literals associated with features of the product and (ii) a number indicating a number of eliminable literals that evaluate to a predetermined state for the clause to be satisfied. The method includes receiving a configuration choice and determining one or more consequences of the choice using numerical unit resolution. Determining one or more consequences of the choice using numerical unit resolution includes asserting a literal corresponding to the configuration choice, eliminating a literal that is a complement of the corresponding literal from every numerical clause containing the complement of the corresponding literal, and recursively asserting any literals in numerical clauses whose number of eliminable literals is zero.

In another embodiment of the present invention, a configuration system having a configuration model comprising numerical clauses, wherein each numerical clause is defined in the form of $\{E/a_1[w_1], a_2[w_2], \ldots a_n[w_n]\}$, wherein "$a_1, a_2, \ldots a_n$" represent literals of variables and may be positive or a negation, E is the maximum total weight that may be eliminated from the numerical clause for the numerical clause to remain satisfiable, and $w_1, w_2, \ldots w_n$ are weights associated with each literal.

In another embodiment of the present invention, a configuration system having a configuration model comprising numerical clauses, wherein each numerical clause is defined in the form of $\{M/a_1[w_1], a_2[w_2], \ldots a_n[w_n]\}$, wherein "$a_1, a_2, \ldots a_n$" represent literals of variables and may be positive or a negation, M is the minimum total weight that must be selected to satisfy the numerical clause, and $w_1, w_2, \ldots w_n$ are weights associated with each literal.

In another embodiment of the invention, a system for configuring a product according to a product definition from plural parts having defined relationships the system includes a configurator having a configuration engine in communication with a configuration model represented by numerical clauses, each numerical clause having one or more literals and an indicator of uneliminated literals required to satisfy the numerical clause and an interface in communication with the configuration engine and operable to assert complements of one or more of the literals.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The term "product" is used herein to generically refer to tangible products, such as systems, as well as intangible products, such as services.

Configurable products are described by sets of selectable features. For example, features of a computer system product might include the type of system (e.g. server, desktop, or laptop), warranty services available, hard drives, power supplies, the type and quantity of processor(s), motherboard, system memory, monitor, graphics card, sound card, etc. Features of an automobile might include the type of engine, tires, exterior paint, interior color, interior covering, sound system, transmission, etc. Configurable products are represented by configuration models that describe constraints on how features relate to each other. For example, some features cannot work together, e.g. a dual processor computer system cannot work with a single processor motherboard. Thus, selection of a dual processor system excludes all single processor motherboards. Inclusion of some features may automatically include one or more additional features or require a choice between one or more other features. For example, inclusion of a hard drive that consumes 150 units of power will include a power supply that supplies sufficient power. Selection of a red exterior color for an automobile may require a choice between brown, gray, and white interior and exclude green interior. Configuration models represent such constraints corresponding to rules.

Configuration system performance can depend on how efficient the configuration model represents constraints. More efficient representation generally results in better computational performance. Additionally, configuration model representation also affects whether the configuration system remains in a valid state, i.e. whether a configured product is actually available, and the type of processes available to process user choices. Furthermore, configuration model representation also affects the difficulty or ease creating the configuration model and creating the configuration engine.

Conventional propositional logic is a well-studied field and includes well-understood conventional inference procedures. These inference procedures allow problems, such as asserting a choice, to be processed and resulting consequences obtained. However, as stated earlier, due to representational explosion, it can be impractical to represent configuration problems expressed in the conventional propositional logic form required by conventional inference procedures such as unit resolution.

Constraint Representation

Embodiments of the present invention address the problems with conventional technology through the use of "numerical clauses" and associated "numerical inference procedures", such as numerical unit resolution.

Figure 1:
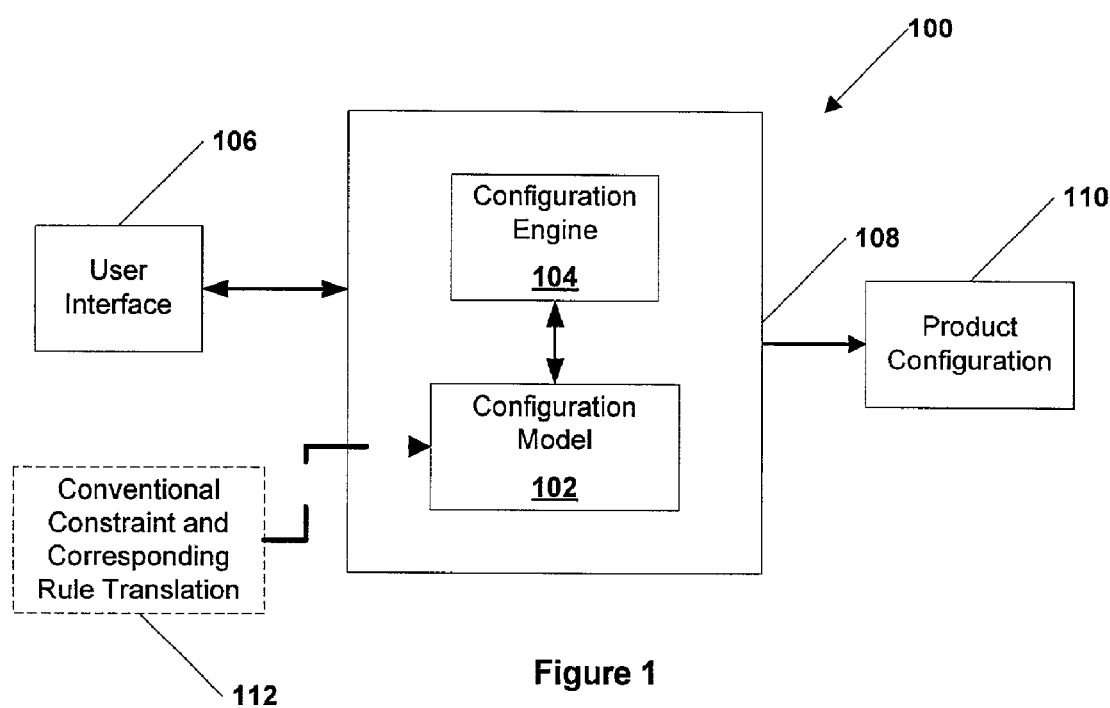
FIG. 1 depicts a block diagram of a system for configuring a product using a configuration model having numerical clauses.

Referring to FIG. 1, the configurator 108 of configuration system 100 includes a configuration model 102. In one embodiment configuration model 102 represents configuration constraints of a product as a conjunction of numerical clauses.

A numerical clause consists of a set of literals, a weight associated with each literal, and a numerical parameter expressing the minimum total weight that must be selected for the clause to satisfied, or, equivalently, the maximum total weight that may be eliminated via resolution without making the clause unsatisfiable.

The general numerical clause is written as follows:

$$\{E/a_1[w_1], a_2[w_2], \ldots a_n[w_n]\} \quad \text{Numerical Clause 1,}$$

or, equivalently:

$$\{M/a_1[w_1], a_2[w_2], \ldots a_n[w_n]\} \quad \text{Numerical Clause 2,}$$

where $a_1, a_2, \ldots a_n$ are literals of variables and may be positive, e.g. $a_1$, or a negation, e.g. $\neg a_1$, $w_1, w_2, \ldots w_n$ are their weights, M is the minimum total weight that must be selected to satisfy Numerical Clause 2, E is the maximum total weight that may be eliminated from Numerical Clause 1 in order for Numerical Clause 1 to remain satisfiable, and M+E is equal to the sum of the weights of all the literals in the clause. (Note: a discussion of elimination is presented below in conjunction with the use of inference procedures by configuration engine 104). When E=0, the clause is referred to as a "numerical unit clause" and is satisfied. Thus, by knowing the weight of each literal, E indicates the amount of 'eliminable' weight in a numerical clause. Weights, w, in Numerical Clause 1 and Numerical Clause 2 can be used to represent the resource quantities of product features. For purposes of this disclosure, when a numerical clause is written without explicitly specifying a weight associated with a literal, e.g., $\{E/a_1, \neg a_2, \ldots a_n\}$, the weight is by default one. Thus, when a literal's associated weight is 1, E indicates the amount of 'eliminable' literals in a numerical clause. In this disclosure, "normal numerical clauses" have weights of one, and "resource numerical clauses" have weights of any amount. A numerical clause becomes unsatisfiable whenever E<0 or, equivalently, M>the number of uneliminated weight in a numerical clause.

Any given constraint may be expressed using M or E, although one or the other may be more intuitive in a given case. For example, it may be more intuitive to express "include" and "exclude" rules and "choice constraints" in terms of M, and resource constraints in terms of E. In the pseudocode and flowcharts that follow, all constraints will be in the E form.

Numerical Clause 1 can be used to represent constraints associated with configuration rules. For example, a constraint that requires a choice ("rc") between one and only one ("(1,1)") of features, a, b, c, d, and e, i.e. rc(1,1){a, b, c, d, e} can be written using two normal numerical clauses:

{E=4/a,b,c,d,e} //at most a weight of 4 can be eliminated, which equates to four literals in this case because the default weight of a, b, c, d, and e is 1; and {E=1/¬a, ¬b, ¬c, ¬d, ¬e} //at most a weight of 1 can be eliminated, which equates to one literal in this case.

Include relationship constraints define a set of elements as inclusive to each other, meaning that a valid configuration that includes some set of selected features must have the additional included parts. Include relationships are stated in a set of one or more numerical clauses, one for each selected feature of a constraint. Each 'includes' numerical clause has a negative literal for selected features and positive literals for the included features. For example, the constraint of "a and b include c and d" is written as two numerical clauses, {E=2/¬a, ¬b, c} //at most a weight of 2 can be eliminated, which equates to two literals in this case; and {E=2/¬a, ¬b, d}///at most a weight of 2 can be eliminated, which equates to 2 literals in this case.

Exclude relationship rules define a set of elements as exclusive to each other, meaning that a valid configuration cannot include all of some set of parts together. Exclude relationships are stated as a numerical clause with all negative literals and a minimum of one. For example, the constraint of "valid configuration cannot have all of a, b, and c together" is written as one numerical clause, $$\{E=2/\neg a, \neg b, \neg c\} \quad \text{Numerical Clause 3}$$

Some product features have associated resource quantities that can be taken into account by configuration engine 104 when generating a product configuration 110. Resource quantities are, for example, a number of available slots associated with a motherboard, an amount of power supplied by a power supply, and an amount of power consumed by a hard drive. It is generally desirable to ensure that a number of provider resource quantities is equal to or greater than a number of consumer resource quantities. Otherwise, an invalid configuration can result. Configuration model 102, using constraints represented in the form of Numerical Clause 1 and/or, can compactly represent product features with associated resource quantities and allow the use of inference procedures to solve configuration problems. In Numerical Clause 1, resource quantities are assigned weights, w. Provider features are associated with provider weights, and consumer features are associated with consumer weights.

For example, a product definition may include a constraint having two resource providers, P having provider weights of 4 and 6, i.e. capable of providing 4 units and the other 6. The constraint may also include four consumer devices C having consumer weights of, 1, 3, 5, and 7, i.e. capable of consuming 1, 3, 5, and 7 units, respectively. The resource numerical clause can be written as:

{E=10/P[4], P[6], ¬C[1], ¬C[3], ¬C[5], ¬C[7]} // at most 10 units of provision potential can be eliminated (by excluding a provider or including a consumer)

As set forth earlier, numerical clauses may also be written as follows:

$$\{M/a_1[w_1], \neg a_2[w_2], \ldots a_n[w_n]\} \quad \text{Numerical Clause 2.}$$

A clause is referred to as a "numerical unit clause" when M equals the weight of the uneliminated literals. Thus, when the weight of literals equals one, M also indicates the number of eliminable literals in a numerical clause. For normal numerical clauses the weight of each literal equals 1. When the minimum is one and the weights are all one (e.g., $\{M=1/a_1, \neg a_2, \ldots a_n\}$) then the numerical clause is equivalent to a conventional disjunction.

To demonstrate the compactness of numerical clauses, recall that a constraint requiring selection of exactly 10 out of a set of 20 features required no less than 335,920 clauses and a total of 3,695,120 literals. Using numerical clauses the same constraint can be written with just 2 clauses and a total of 40 literals:

$$\{M=10/a_1, a_2, a_3, \ldots, a_{20}\} \quad \text{Numerical Clause 4}$$

$$\{M=10/\neg a_1, \neg a_2, \neg a_3, \ldots, \neg a_{20}\} \quad \text{Numerical Clause 5}$$

Numerical Clause 4 represents the constraint that a valid configuration must contain at least 10 of the given features, and Numerical Clause 5 represents the constraint a valid configuration may contain at most 10 of the given features (or, equivalently, Numerical Clauses 2 and 3 can be rewritten by replacing M=10 with E=10 so that the Clauses must contain at least 10 of the negations of the features). The representational growth of translation to conventional CNF has been avoided. As discussed below, configuration system 100 can use numerical clauses to reach the same conclusions that might have been reached from the conventional CNF, but at a cost proportional to 40 literals instead of 3 million.

Clause Nesting

There are some constraints that cannot be conveniently represented with numerical clauses as described so far. One example is a conditional exclusive choice. For example, "if $a_1$, is selected then at most one of $\{b_1, b_2, b_3, b_4\}$ must be chosen". The right-hand side of this rule, i.e. then at most one of $\{b_1, b_2, b_3, b_4\}$ must be chosen, is easily translated into a numerical clause:

"if $a_1$ then $\{3/\neg b_1, \neg b_2, \neg b_3, \neg b_4\}$".

However, to write the entire constraint with numerical clauses we represent the clauses as nested:

$$\{M=1/\neg a_1\{M=3/\neg b_1, \neg b_2, \neg b_3, \neg b_4\}\} \text{ or, equivalently,}$$

$$\{E=1/\neg a_1\{E=1/\neg b_1, \neg b_2, \neg b_3, \neg b_4\}\}.$$

Semantically, a nested clause plays the role of a literal in its enclosing clause. An inner clause may be asserted positively if it is required to satisfy the minimum of its outer clause, in which case its own minimum constraint must be enforced. Conversely, if the inner clause becomes unsatisfiable because too many of its constituents have been eliminated, then the inner clause is asserted negatively and it is eliminated from its enclosing clause.

The nesting of numerical clauses solves the problem of representing conditional choices. It also provides an opportunity to optimize configuration models by factoring out common subexpressions to reduce the size of the model and the cost of unit resolution. For example, the following three clauses:

$\{M=1/-a, -b, -c, d\}$
$\{M=1/-a, -b, -c, e\}$
$\{M=1/-a, -b, -c, f\}$ may be equivalently represented as:

$\{M=1/-a, -b, -c \{M=3/d, e, f\}\}$, or equivalently, $\{E=3/-a, -b, -c \{E=0/d, e, f\}\}$ The nested clause representation has fewer literals and therefore a lower bound on the cost of unit resolution.

Thus, as shown by translation module 112, when constraints and corresponding rules are represented in conventional forms, such as rules having a left-hand side and right-hand side, such constraints and rules can be translated into numerical clauses for use by configuration engine 104. Note, conventional rules having left-hand sides and right-hand sides are described in more detail in Gupta, et al., U.S. Pat. No. 5,825,651, issued Oct. 20, 1998 to Trilogy Development Group, Inc., and entitled "Method and Apparatus for Maintaining and Configuring Systems".

Configuration

Referring to FIG. 1, implementation of configuration model 102 using numerical clauses permits configuration engine 104 to use a variety of inference procedures to determine the consequences of a user choice submitted to configurator 108 via user interface 106. One such inference procedure is referred to herein as numerical unit resolution, which is a generalization of propositional unit resolution. Conventional unit resolution is a propositional logic inference procedure that combines clauses containing a disjunction of literals with a unit clause to eliminate complementary literals. Numerical clauses are resolved in a similar manner except that numerical resolution includes the addition of the numerical minimum for each clause and a reduction of the total of the minimums for each complementary literal that is eliminated.

When configurator 108 receives a user choice, configuration engine 104 asserts the user choice as a unit clause, i.e. the unit clause contains a single literal representing the user choice. Numerical unit resolution is performed between the asserted unit clause and numerical clauses of configuration model 102. In one embodiment, configuration engine 104 maintains a list of numerical clauses and the literals contained in the numerical clauses, and unit resolution is only performed between the asserted unit clause and those numerical clauses containing a literal that is the negation of the literal in the unit clause.

For example, if a configuration model 102 includes a constraint "a" includes "b", represented by numerical clause, $$\{E=1/\neg a, b\} \quad \text{Numerical Clause 6}$$

and the user choice is $\{a\}$, numerical unit resolution between $\{E=1/\neg a, b\}$ and $\{a\}$ results in a resolvent numerical clause of $\{E=0/b\}$. The state of configuration model 102 is updated by configuration engine 104 to reflect the replacement of $\{E=1/\neg a, b\}$ with $\{E=0/b\}$. Since E=0, the amount of provider weight that can be eliminated from the resolvent clause is 0. In other words, the number of eliminable literals of the resolvent clause $\{E=0/b\}$ is 0, and the resolvent clause is referred to a "numerical unit clause". Thus, Numerical Clause 6 is satisfied, and a product feature represented by "b" would be included in a product configuration 110.

Nested numerical clauses may be resolved in a similar manner. For example, if configuration model 102 includes a constraint "a" requires a choice of at least two required choice features, b, c, d, and e, $$\{E=1/\neg a, \{E=2/b,c,d,e\}\} \quad \text{Numerical Clause 7}$$

and the user choice is {a},
numerical unit resolution between {E1/¬a, {E=2/b,c,d,e}} and {a} results in updating configuration model 102 to reflect the resolvent numerical clause of {E=2/b,c,d,e}.

Referring to Numerical Clause 7, if as a result of user selections, feature "b" cannot be selected, configuration engine 104 asserts {¬b}, and numerical resolution between {¬b} and {E=2/b,c,d,e} results in updating configuration model 102 to reflect resolvent numerical clause of {E=1/c,d,e}. If "c", "d", and "e" cannot be selected, E=−2, and Numerical Clause 7 becomes unsatisfiable. Thus, the negation of inner clause {E=2/b,c,d,e} is asserted to exclude "a" from the product configuration state. Thus, nested numerical clauses are resolved by either positively or negatively asserting inner clauses. Outer clauses are positively asserted as part of the initial configuration state, and inner clauses are not initially asserted. An inner clause is asserted positively if the inner clause is asserted by the outer clause, such as when literals are eliminated from the outer clause until the inner clause must be asserted to meet the minimum of the outer clause. An inner clause is asserted negatively if it becomes unsatisifiable, such as if literals are eliminated from the inner clause until its minimum cannot be met.

Figure 2:
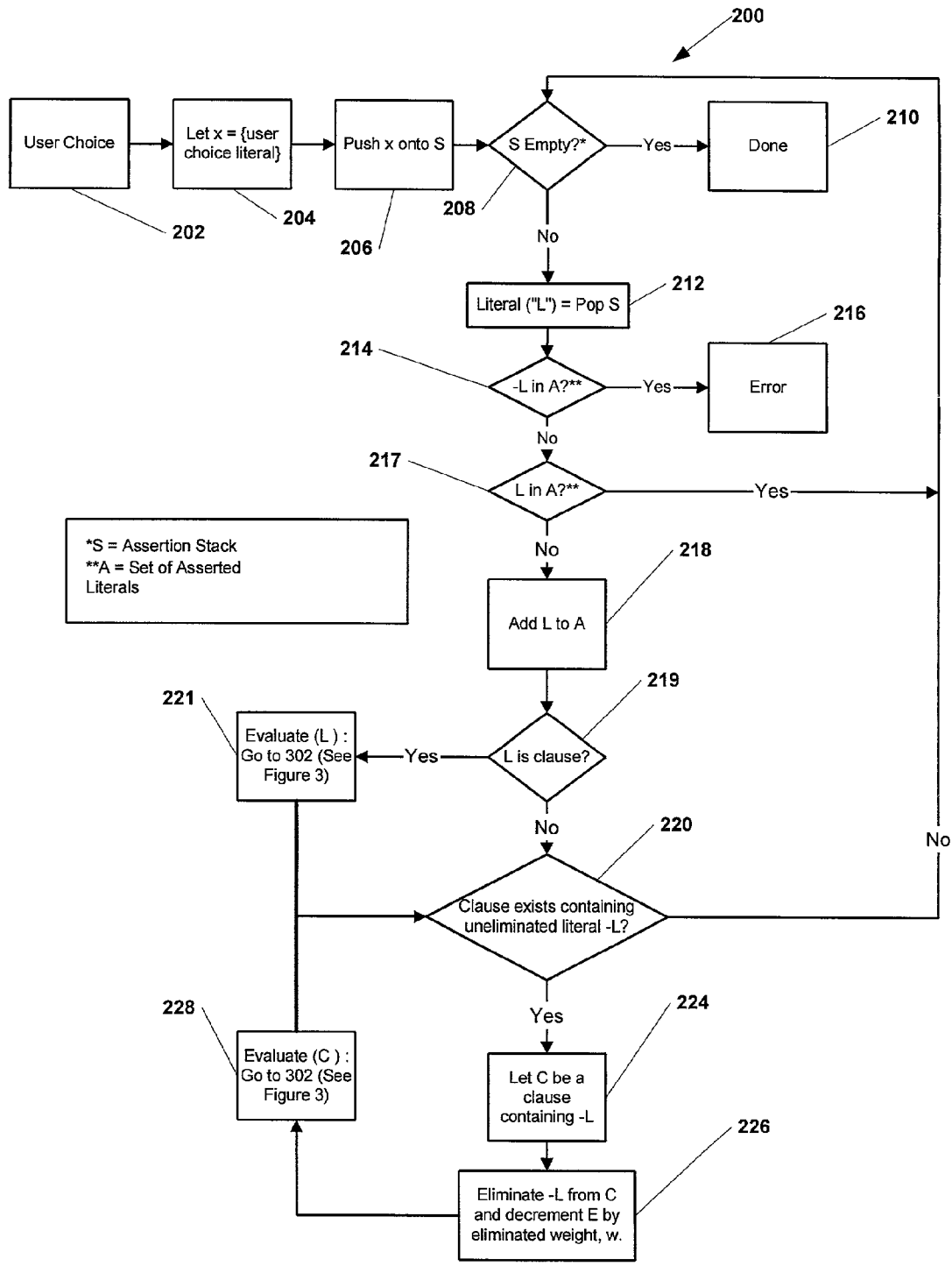
FIG. 2 depicts a configuration process for operating on numerical clauses.

Referring to FIG. 2, configuration process 200 illustrates one embodiment of the operation of configuration engine 104. In summary, configuration process 200 performs numerical unit resolution between an asserted unit clause (i.e. a clause with one literal) and numerical clauses having the a complement of the asserted literal. Numerical clauses containing the complement literal are recursively asserted, one literal at a time, when E=0 a clause is satisfied. E may evaluate to less than zero in an inner clause of a nested clause. If so, the negation of the inner clause is asserted to prevent selection of the outer clause literals.

FIG. 2 will be illustrated using the following example configuration computer system configuration model having four example constraints:

Plain Language Constraints:
Constraint 1: If a user chooses a server, the server includes a warranty and an uninterruptable power supply.
Constraint 2: User must choose between laptop, desktop, or server.
Constraint 3: A laptop includes a carrying case.
Constraint 4: A cathode ray tube monitor excludes a flat screen monitor.
Constraint 5: A premium package includes a read-write CD peripheral and a flat screen monitor.
Constraint 6: Two hard drives consuming 50 power units and 100 power units, respectively, may be selected. Two power supplies providing 75 and 150 power units, respectively, may be selected.

For convenience of representation, each feature is assigned a variable as follows:
CC=Carrying case.
CDRW=read-write CD system.
CRT=cathode ray tube monitor.
D=Desktop.
FS=Flat screen monitor.
HDX[m]=Hard Drive X with consumer weight "m".
LT=Laptop.
P=Premium Package.
PSY[n]=Hard Drive Y with provider weight "n".
SV=Server.
W=Warranty.
UPS=uninterruptable power supply.
Numerical Clause representation of Constraints 1–4:

| | |
|---|---|
| Constraint 1: {$E=1/¬SV$, {$E=0/W,UPS$}} | Numerical Clause 8; |
| Constraint 2: {$E=2/LT,D,SV$} | Numerical Clause 9; |
| {$E=1/¬LT, ¬D, ¬SV$} | Numerical Clause 10; |
| Constraint 3: {$E=1/¬LT, CC$} | Numerical Clause 11; |
| Constraint 4: {$E=1/¬CRT, ¬FS$} | Numerical Clause 12; |
| Constraint 5: {$E=1/¬P$, {$E=02/CDRW, FS$}} | Numerical Clause 13; and |
| Constraint 6: {$E=225/¬HDA[50]$, $¬HDB[100]$, $PSA[75]$, $PSA[150]$} | Numerical Clause 14. |

Prior to accepting a user choice, configuration engine 104 asserts all clauses except inner clauses in nested numerical clauses. When using numerical unit resolution as an inference procedure, asserting numerical unit clauses can eliminate literals in other clauses. If resolvent clauses are numerical unit clauses, then these resolvent clauses are also asserted. Pre-configuration assertion of numerical unit clauses has the affect of reducing the size of the configuration model 102 without losing any soundness or completeness. Inner clauses in nested numerical clauses are not asserted because inner clauses contain conditional constraints that are only applicable if the outer clause are satisfied.

In operation 202 of configuration process 200, a user makes a choice such as selecting a server. Operation 204 lets x={SV}, where x is a unit clause and SV is a positive literal representing the user's choice of a server. Operation 206 pushes all literals in set "x" onto the top of stack S, except for literals already present in A. Stack S is a LIFO (last in first out) stack, and a A is the set of asserted literals. Operation 208 determines whether stack S is empty. If stack S is empty, the recursive propagation of literals performed by configuration process 200 is Done, as indicated in operation 210. Configuration process 200 is now ready to receive another user choice. As illustrated below, the current state of the product's configuration can be determined by examining the contents of asserted literal set A and subsumed constraints. In some embodiments, configuration engine 104 can be programmed to make default selections. In other embodiments, the user could be prompted to make additional choices so that constraints such as requires choice and include constraints can be satisfied.

In the current example, stack S contains literal SV, and is, thus, not empty. Operation 212 pops (i.e. removes) the top variable from stack S and assigns it as a literal, L. In the current propagation of literals, SV is on top of stack S, thus, L=SV. If operation 214 determines that ¬L has already been asserted in operation 226 and is, thus, a member of set A (the set of uneliminated literals), then an error has occurred as indicated in operation 216. This error could occur if the user tries to select a literal that is logically excluded. In the current example, set A does not contain SV. Operation 217 determines whether SV has already been asserted and is, thus a member of set A. If L is in A, then to prevent unnecessary operations, configuration process 200 returns to operation 208. In the current example, operation 217 determines that the set A does not include SV, and operation 218 includes SV in set A so that A={SV}.

Since a literal can be a clause when using nested numerical clauses, operation 219 determines if L is a clause. In the current example, L=SV, which is a literal. So, operation 219 evaluates to "No", and operation 220 determines whether a clause exists in configuration model 102 that contains ¬SV. If not, configuration process 200 returns to operation 208.

However, in the current example, Numerical Clause 8 contains ¬SV, and configuration process 200 proceeds to operation 224. Operation 224 takes a clause having ¬SV, and operation 226 uses numerical unit resolution between x={SV} and {E=1/¬SV, {E=0/W,RM,UPS}}, which is Numerical Clause 8, to generate a new clause C={E=0/{E=0/W,RM,UPS}}. In one embodiment, configuration process 200 is implemented in software as described below and directly tracks which clauses, if any, contain the asserted literal.

Figure 3:
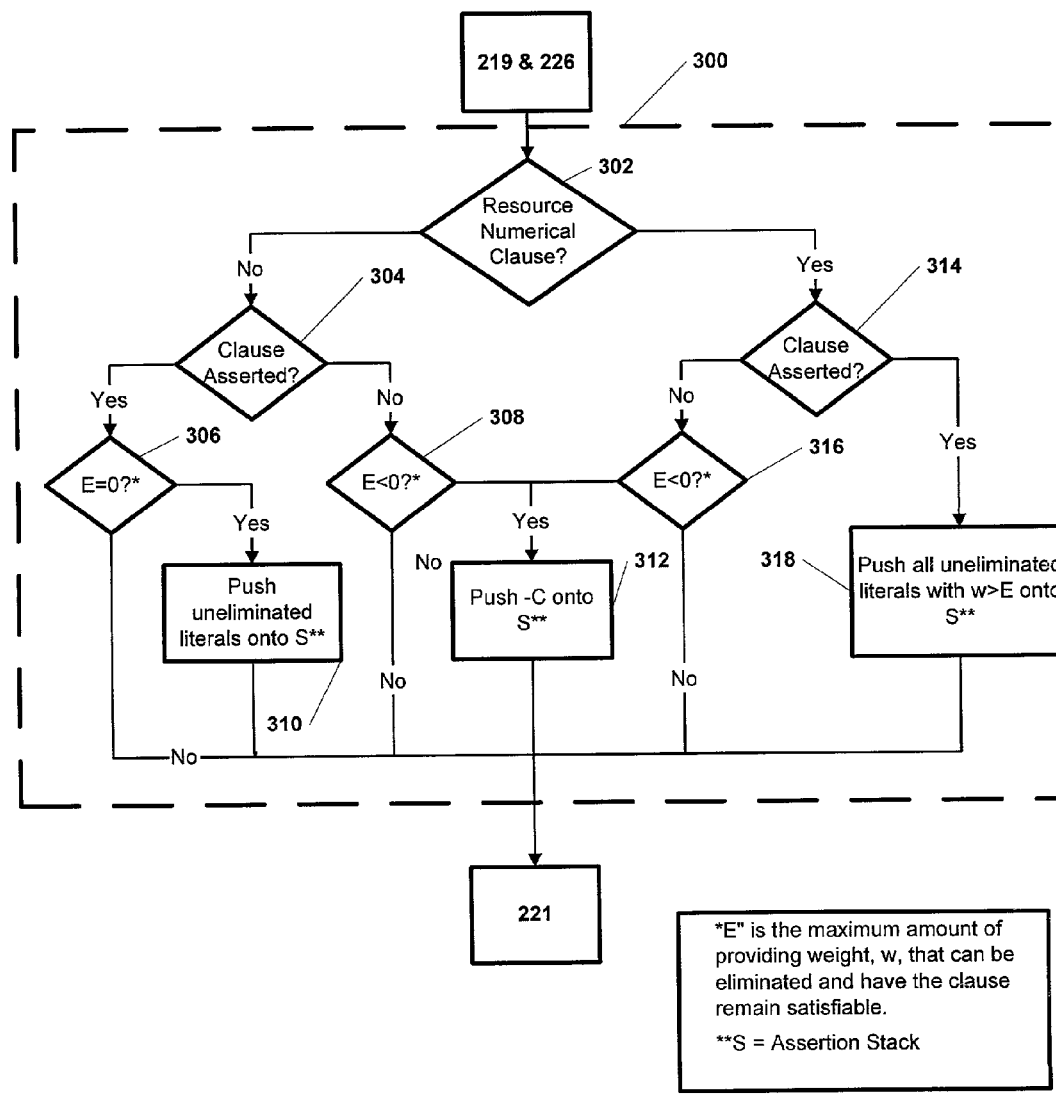
FIG. 3 depicts an evaluation routine, called by the configuration process of FIG. 2, which evaluates weighted and unweighted numerical clauses and nested and unnested numerical clauses.

Operation 228 causes configuration process 200 to perform an evaluation routine 300, depicted in FIG. 3. Evaluation routine 300 allows configuration process 200 to operate on (i) nested and non-nested regular numerical clauses and (ii) nested and non-nested resource numerical clauses. Operation 302 determines whether a clause is a resource numerical clause or a regular numerical clause. If the clause contains is a resource numerical clause, operation 314 determines whether the clause C from operation 226 (or the clause represented by L if entering evaluation routine 300 via operation 221) has been asserted. If the clause in operation 314 has been asserted, operation 318 pushes all uneliminated literals in the clause with a weight, w, greater than E onto assertion stack S. Evaluation routine 300 then proceeds to operation 220. For a clause, E is the is the maximum amount of providing weight, w, that can be eliminated. If the clause in operation 314 is not asserted, operation 316 determines whether E<0. If E is less than zero, then the quantity of provider weights is insufficient to satisfy consumer requirements. Accordingly, in operation 312 the negation of the clause is pushed onto stack S to eliminate the literals as a selectable choice, and evaluation routine 300 returns to operation 220.

In the current example, clause C is not weighted, so the outcome of operation 302 evaluates to "No", and operation 304 determines whether C has been asserted. As stated earlier, configuration engine 104 asserts all clauses except inner nested clauses prior to accepting user choices. Thus, C has been asserted, and operation 306 determines whether E=0 for C, i.e. whether C is a numerical unit clause. In the present example, C={E=0/{E=0/W,UPS}}. Since {E=0/W, UPS} represents a single literal in the outer clause of Numerical Clause 8, E=0 for clause C, and C is a numerical unit clause. Thus, evaluation routine 300 proceeds to operation 310 where the uneliminated literals, W and UPS, are individually pushed onto the top of stack S. If C had not been a numerical unit clause, operation 306 would have evaluated to "No", and evaluation routine 300 would return to operation 220. In this case, clause C would be satisfiable but not yet satisfied.

Returning to operation 304, if C had not been asserted yet, operation 304 would have evaluated to "No". Operation 308 would determine whether E<0 for C. Operation 308 could evaluate to "Yes" if C is unsatisfiable because the number of literals in an inner clause of a nested numerical clause is less than the minimum number for C to be satisfiable. If operation 308 evaluates to "Yes", in operation 312 the negation of C is pushed onto stack S to eliminate an outer clause of C. If operation 308 evaluates to "No", C remains satisfiable, and evaluation routine 300 returns to operation 220.

Continuing the current example, operation 220 again determines whether any clause containing ¬SV exists in configuration model 102. Operation 220 determines that Numerical Clause 10 includes the uneliminated literal ¬SV, and configuration process 200 proceeds as described above.

Table 5 demonstrates one embodiment of how configuration process 200 can operate on the foregoing Constraints computer system configuration and assumes that no prior user choices have been made so that S and A are empty:

TABLE 5

| Order | OPERATION | RESULT |
|---|---|---|
| 1. | 202 | User Choice = SV |
| 2. | 204 | x = {SV} |
| 3. | 206 | S = SV |
| 4. | 208 | No |
| 5. | 212 | L = SV, S = [ ] |
| 6. | 214 | No, i.e. A = { } |
| 7. | 217 | No |
| 8. | 218 | A = {SV} |
| 9. | 219 | No |
| 10. | 220 | Yes, i.e. Numerical Clause 8 |
| 11. | 224 | C = {E = 1/¬SV, {E = 0/W, UPS}} |
| 12. | 226 | C = {E = 0/{E = 0/W, UPS}} |
| 13. | 228 | Go to 302 |
| 14. | 302 | No |
| 15. | 304 | Yes, i.e. Operation 304 is operating on the outer clause of C, C = {E = 0/A}, where literal A = inner clause {E = 0/W, UPS} |
| 16. | 306 | Yes |
| 17. | 310 | S = W, UPS |
| 18. | 220 | Yes, i.e. Numerical Clause 10 |
| 19. | 224 | C = {E = 1/¬LT, ¬D, ¬SV} |
| 20. | 226 | C = {E = 0/¬LT, ¬D} |
| 21. | 228 | Go to 302 |
| 22. | 302 | No |
| 23. | 304 | Yes |
| 24. | 306 | Yes |
| 25. | 310 | S = ¬LT, ¬D, W, UPS |
| 26. | 220 | No |
| 27. | 208 | No |
| 28. | 212 | L = ¬LT, S = ¬D, W, UPS |
| 29. | 214 | No |
| 30. | 217 | No |
| 31. | 218 | A = {SV, ¬LT} |
| 32. | 219 | NO |
| 33. | 220 | Yes, i.e. Numerical Clause 9, where ¬L = ¬(¬LT) = LT |
| 34. | 224 | C = {E = 2/LT, D, SV} |
| 35. | 226 | C = {E = 1/D, SV} |
| 36. | 302 | No |
| 37. | 304 | Yes |
| 38. | 306 | No |
| 39. | 220 | No |
| 40. | 208 | No |
| 41. | 212 | L = ¬D, S = W, UPS |
| 42. | 214 | No |
| 43. | 217 | No |
| 44. | 218 | A = {SV, ¬LT, ¬D} |
| 45. | 219 | No |
| 46. | 220 | Yes, i.e. Numerical Clause 9 uneliminated literals, where ¬L = ¬(¬D) = D |
| 47. | 224 | C = {E = 1/D, SV} |
| 48. | 226 | C = {E = 0/SV} |
| 49. | 302 | No |
| 50. | 304 | Yes |
| 51. | 306 | Yes |
| 52. | 310 | S = SV, W, UPS |
| 53. | 220 | No |
| 54. | 208 | No |
| 55. | 212 | L = SV, S = W, UPS |
| 56. | 214 | No |
| 57. | 217 | Yes |
| 58. | 208 | No |
| 59. | 212 | L = W, S = UPS |
| 60. | 214 | No |
| 61. | 217 | No |
| 62. | 218 | A = {SV, ¬LT, ¬D, W} |
| 63. | 219 | No |
| 64. | 220 | No |
| 65. | 208 | No |
| 66. | 212 | L = UPS, S = [ ] |
| 67. | 214 | No |
| 68. | 217 | No |
| 69. | 218 | A = {SV, ¬LT, ¬D, W, UPS} |
| 70. | 219 | No |

TABLE 5-continued

| Order | OPERATION | RESULT |
|---|---|---|
| 71. | 220 | No |
| 72. | 208 | Yes |
| 73. | 210 | Done. |
| 74. | 202 | User choice = CRT |
| 75. | 204 | x = {CRT} |
| 76. | 206 | S = CRT |
| 77. | 208 | No |
| 78. | 212 | L = CRT, S = [ ] |
| 79. | 214 | No |
| 80. | 217 | No |
| 81. | 218 | A = {SV, ¬LT, ¬D, W, UPS, CRT} |
| 82. | 219 | No |
| 83. | 220 | Yes, i.e. Numerical Clause 12 |
| 84. | 224 | C = {E = 1/¬CRT, ¬FS} |
| 85. | 226 | C = {E = 0/¬FS} |
| 86. | 228 | Go to 302 |
| 87. | 302 | No |
| 88. | 304 | Yes |
| 89. | 306 | Yes |
| 90. | 310 | S = ¬FS |
| 91. | 220 | No, i.e. L = CRT |
| 92. | 208 | No |
| 93. | 212 | L = ¬FS, S = [ ] |
| 94. | 214 | No |
| 95. | 217 | No |
| 96. | 218 | A = {SV, ¬LT, ¬D, W, UPS, CRT, ¬FS} |
| 97. | 219 | No |
| 98. | 220 | Yes, ¬L = ¬(¬FS) = FS |
| 99. | 224 | C = {E = 0/CDRW, FS} |
| 100. | 226 | C = {E = −1/CDRW} |
| 101. | 228 | Go to 302 |
| 102. | 302 | No |
| 103. | 304 | No, i.e. C is an inner clause of a nested numerical clause and has, thus, not been asserted. |
| 104. | 308 | Yes |
| 105. | 312 | S = ¬{E = 0/CDRW, FS}, ¬FS |
| 106. | 220 | No, i.e. L = ¬FS |
| 107. | 208 | No |
| 108. | 212 | L = ¬{E = 0/CDRW, FS}, S = ¬FS |
| 109. | 214 | No |
| 110. | 217 | No |
| 111. | 218 | A = {SV, ¬LT, ¬D, W, UPS, CRT, ¬FS, ¬{E = 0/CDRW, FS}} |
| 112. | 219 | Yes |
| 113. | 221 | Go to 302 |
| 114. | 302 | No |
| 115. | 304 | No |
| 116. | 308 | Yes, i.e. FS was already eliminated |
| 117. | 220 | Yes, i.e. Numerical Clause 13. |
| 118. | 224 | C = {E = 0/¬P, {E = 0/CDRW, FS}} |
| 119. | 226 | C = {E = 0/¬P} |
| 120. | 228 | Go to 302 |
| 121. | 302 | No |
| 122. | 304 | Yes |
| 123. | 306 | Yes |
| 124. | 310 | S = ¬P, ¬FS |
| 125. | 220 | No |
| 126. | 208 | No, S = ¬P, ¬FS |
| 127. | 212 | L = ¬P, S = ¬FS |
| 128. | 214 | No |
| 129. | 217 | No |
| 130. | 218 | A = {SV, ¬LT, ¬D, W, UPS, CRT, ¬FS, ¬{E = 0/CDRW, FS}, ¬P} |
| 131. | 219 | No |
| 132. | 220 | No |
| 133. | 208 | No |
| 134. | 212 | L = ¬FS, S = [ ] |
| 135. | 214 | No |
| 136. | 217 | Yes |
| 137. | 208 | Yes |
| 138. | 210 | Done |
| 139. | 202 | User Choice = HDA |
| 140. | 204 | x = {HDA[50]} |
| 141. | 206 | S = {HDA[50]} |
| 142. | 208 | No |
| 143. | 212 | L = HDA[50], S = [ ] |
| 144. | 214 | No |
| 145. | 217 | No |
| 146. | 218 | A = {SV, ¬LT, ¬D, W, UPS, CRT, ¬FS, ¬{E = 0/CDRW, FS}, ¬P, HDA} |
| 147. | 219 | No |
| 148. | 220 | Yes, i.e. Numerical Clause 14 |
| 149. | 224 | C = {E = 225/¬HDA[50], ¬HDB[100], PSA[75], PSA[150]} |
| 150. | 226 | {E = 175/¬HDB[100], PSA[75], PSA[150]} |
| 151. | 228 | Go to 302 |
| 152. | 302 | Yes |
| 153. | 314 | Yes |
| 154. | 318 | S = [ ], E = 175 |
| 155. | 220 | No |
| 156. | 208 | Yes |
| 157. | 210 | No |
| 158. | 202 | User choice = HDB[100] |
| 159. | 204 | x = {HDB[100]} |
| 160. | 206 | S = {HDB[100]} |
| 161. | 208 | No |
| 162. | 212 | L = HDB[100], S = [ ] |
| 163. | 214 | No |
| 164. | 217 | No |
| 165. | 218 | A = {SV, ¬LT, ¬D, W, UPS, CRT, ¬FS, ¬{E = 0/CDRW, FS}, ¬P, HDA, HDB} |
| 166. | 219 | No |
| 167. | 220 | Yes |
| 168. | 224 | C = {E = 175/¬HDB[100], PSA[75], PSA[150]} |
| 169. | 226 | C = {E = 75/PSA[75], PSB[150]} |
| 170. | 228 | Go to 302 |
| 171. | 302 | Yes |
| 172. | 314 | Yes |
| 173. | 318 | S = PSB[150], i.e. 150 > E = 75 |
| 174. | 220 | No |
| 175. | 208 | No |
| 176. | 212 | L = PSB[150], S = [ ] |
| 177. | 214 | No |
| 178. | 217 | No |
| 179. | 218 | A = {SV, ¬LT, ¬D, W, UPS, CRT, ¬FS, ¬{E = 0/CDRW, FS}, ¬P, HDA, HDB, PSB} |
| 180. | 219 | No |
| 181. | 220 | No |
| 182. | 208 | Yes |
| 183. | 210 | Done |

Referring to FIG. 1, the current product configuration 110 can be determined by evaluating the set of asserted literals, A. Set A={SV, ¬LT, ¬D, W, UPS, CRT, ¬FS, ¬{E=0/CDRW, FS}, ¬P, HDA, HDB, PSB}. Thus, the current product configuration state includes a server (SV), a warranty (W), a UPS, a CRT monitor (CRT), hard drive A, hard drive B, and power supply B. The current product configuration state excludes a laptop, a desktop, a flat screen monitor, and a premium package. The current configuration state also excludes the combination of a CDRW and a flat screen monitor. Note that in this example, every constraint in configuration model 102 does not have to be satisfied. For example, constraint 3 remains unsatisfied because a laptop was not selected and a carrying case was not excluded.

It will be evident that configuration model 102 and configuration engine 104 can be used to configure a product with an unlimited number of features.

The configuration engine 104 and configuration model 102 can be implemented in many different ways. In one embodiment, configuration engine 104 is implemented using computer software executable by a data processing system. Following is example pseudocode can be used to implement an embodiment of configuration engine 104, which can access and operate on configuration model 102. Note: explanatory comments are presented after double forward slashes, "//". The pseudocode implementation of configuration engine 104 uses a "logic-based truth maintenance system" (LTMS) for numerical clauses, which can be generally referred to as "boolean constraint propagation" (BCP) for numerical clauses. The BCP presented below is logically equivalent to numerical unit resolution except that resolvent numerical clauses are not explicitly generated.

```
// ========================================================
// pseudocode for conventional unit resolution
// ========================================================
Static data:
    For each clause, a list of the literals it contains
    For each literal, a list of the clauses that contain it
Dynamic data:
    For each literal, a boolean indicating whether it is asserted
    For each clause, the number of uneliminated literals it contains.
// called to assert a literal
Procedure Assert(Literal L)
    If L is not already marked as asserted
        Mark L as asserted
        For each clause, C, containing the negation of L
            LiteralEliminated(C)
        End For
    End If
End Assert
// called to update a clause to reflect the fact that one of its literals has
been eliminated
LiteralEliminated(Clause C)
    Decrement the number of uneliminated literals in C
    If the number of uneliminated literals in C is now one
        // assert the single uneliminated literal in C
        AssertUneliminated(C)
    End If
End LiteralEliminated
// called to assert all uneliminated literals in a clause
AssertUneliminated(Clause C)
    For each literal, L, in C
        If L's negation is not asserted (i.e. L is uneliminated)
            Assert(L)
        End If
    End For
End AssertUneliminated
// ========================================================
// pseudocode for numerical unit resolution
// ========================================================
Static data:
    For each clause, a list of the literals it contains
    For each literal, a list of the clauses that contain it
Dynamic data:
    For each literal, a boolean indicating whether it is asserted
    For each clause, the value of E.
Algorithm same as for conventional unit resolution, with the following
changes:
LiteralEliminated(Clause C)
    Decrement E by one.
    If E equals zero
        AssertUneliminated(C)
    End If
End LiteralEliminated
// ========================================================
// pseudocode for numerical unit resolution with nesting
// ========================================================
Modify data structures so that a clause may be treated as a literal within
another clause. The outermost clauses are initially asserted. Nested clauses
are not. Just like a normal literal, a clause has a negation, which gets
asserted when the clause becomes unsatisfiable (something that can only
happen to a nested clause since the outermost clauses are initially
asserted).
Static data:
    For each clause, a list of the literals and clauses it contains
    For each literal or clause, a list of the clauses that contain it
Dynamic data:
    For each literal or clause, a boolean indicating whether it is asserted
    For each clause, the value of E.
Algorithm same as for numerical unit resolution, with the following
changes:
Procedure Assert(LiteralOrClause L)
    If L is not already marked as asserted
        Mark L as asserted
        For each clause, C, containing the negation of L
            LiteralEliminated(C)
        End For
        If L is a Clause and its E equals zero
            AssertUneliminated(L)
        End If
    End If
End Assert
LiteralEliminated(Clause C)
    Decrement E by one.
    If E equals zero
        AssertUneliminated(C)
    Else If E is less than zero
        Assert(negation(C))
    End If
End LiteralEliminated
// ========================================================
// numerical unit resolution with weights (but w/o nesting for simplicity)
// ========================================================
Static data:
    For each clause, a list of the literals it contains
    For each literal, a list of the clauses that contain it
    For each (clause,literal) association, a numerical weight.
Dynamic data:
    For each literal, a boolean indicating whether the literal is asserted
    For each clause, the value of E.
Algorithm as follows:
Procedure Assert(Literal L)
    If L is not already marked as asserted
        Mark L as asserted
        For each clause, C, containing the negation of L
            LiteralEliminated(C,L)
        End For
    End If
End Assert
LiteralEliminated(Clause C, Literal L)
    Subtract the weight of (C,L) from E
    For each literal, L, in C.
        If L is uneliminated and the weight of (C,L) exceeds E
            Assert(L)
        End If
    End For
End LiteralEliminated
[End of pseudocode]
```

Figure 4:
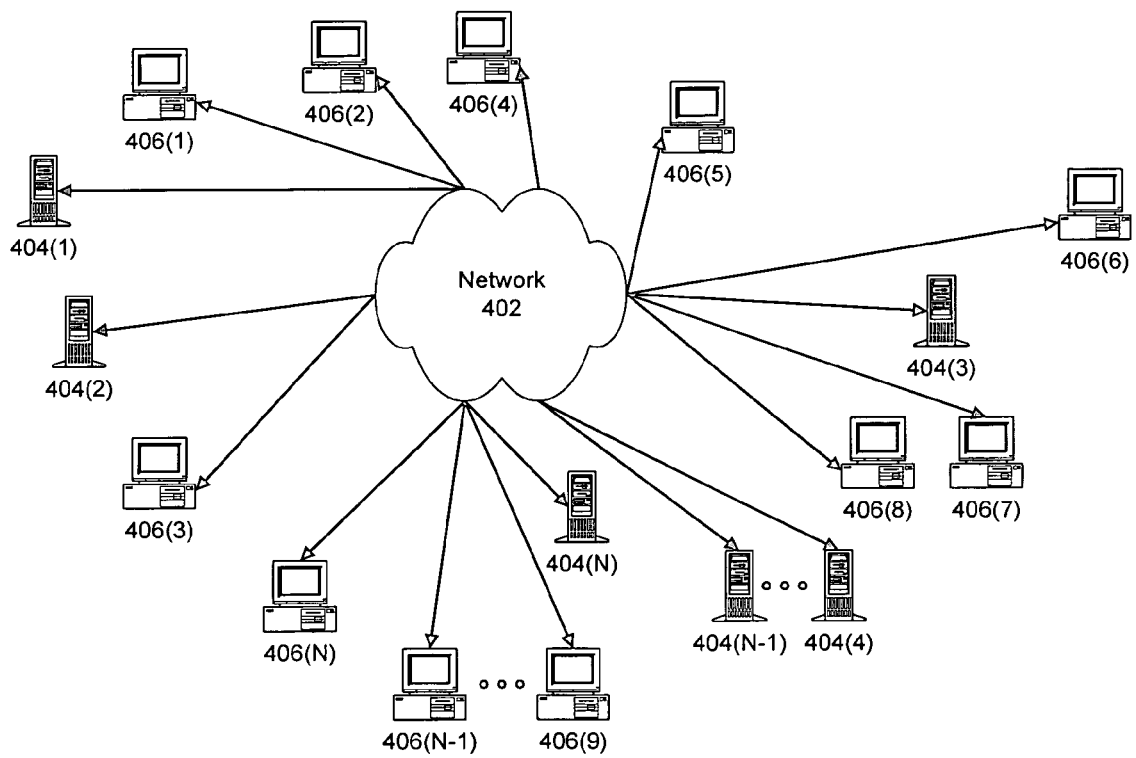
FIG. 4 depicts a block diagram illustrating a network environment in which a configuration system 100 may be practiced.

FIG. 4 is a block diagram illustrating a network environment in which a configuration system 100 may be practiced. Network 402 (e.g. a private wide area network (WAN) or the Internet) includes a number of networked server computer systems 404(1)–(N) that are accessible by client computer systems 406(1)–(N), where N is the number of server computer systems connected to the network. Communication between client computer systems 406(1)–(N) and server computer systems 404(1)–(N) typically occurs over a network, such as a public switched telephone network over asynchronous digital subscriber line (ADSL) telephone lines or high-bandwidth trunks, for example communications channels providing T1 or OC3 service. Client computer systems 406(1)–(N) typically access server computer systems 404(1)–(N) through a service provider, e.g., an Internet service provider such as America On-Line™, Prodigy™, CompuServe™, and the like by executing application specific software, commonly referred to as a browser, on one of client computer systems 406(1)–(N).

Client computer systems 406(1)–(N) and/or server computer systems 404(1)–(N) may be, for example, computer systems of any appropriate design, including a mainframe, a mini-computer, a personal computer system, or a wireless, mobile computing device. These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, CD-ROM drives and magneto-optical drives may also be provided, either as an integrated or peripheral device. One such example computer system is shown in detail in FIG. 5.

Figure 5:
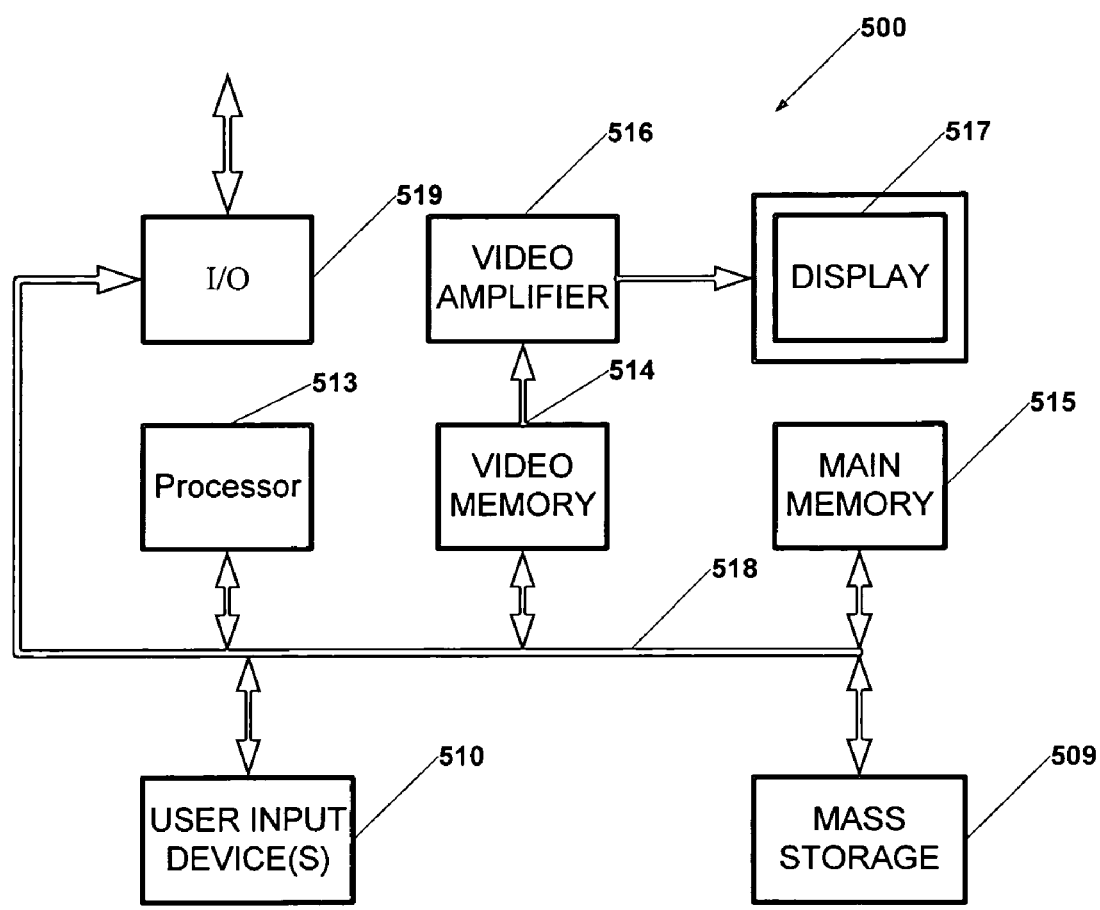
FIG. 5 depicts a general-purpose computer system with which embodiments of the configurator 108 can be implemented.

Embodiments of the configurator 108 can be implemented on a computer system such as a general-purpose computer 500 illustrated in FIG. 5. Input user device(s) 510, such as a keyboard and/or mouse, are coupled to a bi-directional system bus 518. The input user device(s) 510 are for introducing user input to the computer system and communicating that user input to processor 513. The computer system of FIG. 5 also includes a video memory 514, main memory 515 and mass storage 509, all coupled to bi-directional system bus 518 along with input user device(s) 510 and processor 513. The mass storage 509 may include both fixed and removable media, such as other available mass storage technology. Bus 518 may contain, for example, 32 address lines for addressing video memory 514 or main memory 515. The system bus 518 also includes, for example, an n-bit DATA bus for transferring DATA between and among the components, such as CPU 509, main memory 515, video memory 514 and mass storage 509, where "n" is, for example, 32 or 64. Alternatively, multiplex DATA/address lines may be used instead of separate DATA and address lines.

I/O device(s) 519 may provide connections to peripheral devices, such as a printer, and may also provide a direct connection to a remote server computer systems via a telephone link or to the Internet via an internet service provider (ISP). I/O device(s) 519 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 509 until loaded into main memory 515 for execution. Computer programs may also be in the form of electronic signals modulated in accordance with the computer program and data communication technology when transferred via a network. The method and functions relating to configuration system 100 may be implemented in a computer program alone or in conjunction with hardware, such as application specific processor(s) and field programmable technology. Furthermore, context subsystem data structures can be implemented in CPU 500 and utilized by CPU 500 or by other data processing systems that have access to the data structures.

The processor 513, in one embodiment, is a 32-bit microprocessor manufactured by Motorola, such as the 680X0 processor or microprocessor manufactured by Intel, such as the 80X86, or Pentium processor. However, any other suitable single or multiple microprocessors or microcomputers may be utilized. Main memory 515 is comprised of dynamic random access memory (DRAM). Video memory 514 is a dual-ported video random access memory. One port of the video memory 514 is coupled to video amplifier 516. The video amplifier 516 is used to drive the display 517. Video amplifier 516 is well known in the art and may be implemented by any suitable means. This circuitry converts pixel DATA stored in video memory 514 to a raster signal suitable for use by display 517. Display 517 is a type of monitor suitable for displaying graphic images.

The computer system described above is for purposes of example only. The configuration system 100 may be implemented in any type of computer system or programming or processing environment. It is contemplated that the configurator 108 might be run on a stand-alone computer system, such as the one described above. The configurator 108 might also be run from a server computer systems system that can be accessed by a plurality of client computer systems interconnected over an intranet network. Finally, the configurator 108 may be run from a server computer systems that is accessible to clients over the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

It will be evident to those of ordinary skill in the art that configuration engine 104 can incorporate other general features of configuration engines such as cloning a configuration model in a particular state to perform "what if" analysis.

It will also be evident to those of ordinary skill in the art that other conventional inference procedures may be adapted to process numerical clauses.

Although the present invention has been described in detail, it should be understood that various changes, substitutions and alterations can be made hereto without departing from the spirit and scope of the invention as defined by the appended claims.

What is claimed is:

1. A method of configuring a product using a configuration model having a conjunction of numerical clauses representing configuration constraints, wherein each numerical clause includes (i) a set of literals associated with features of the product and (ii) a number indicating a number of eliminable literals that evaluate to a predetermined state for the numerical clause to be satisfied, the method comprising:
    receiving a configuration choice;
    determining one or more consequences of the choice using numerical unit resolution comprising:
        asserting a literal corresponding to the configuration choice;
        eliminating a literal that is a complement of the corresponding literal from every numerical clause containing the complement of the corresponding literal; and
        recursively asserting any literals in numerical clauses whose number of eliminable literals is zero; and
    generating a configuration of the product in accordance with the configuration choice and the determined one or more consequences of the configuration choice.

2. The method of claim 1 further comprising:
    after determining the one or more consequences of the choice, updating a state of the configuration model to represent the one or more consequences.

3. The method of claim 2 wherein a numerical unit clause is a clause whose number of eliminable literals is zero, and updating the state of the configuration model further comprises:
    representing a feature of the product as excluded if such feature is associated with a numerical unit clause;

representing the feature as included if such feature is associated with a positive literal that exists in a numerical unit clause; and representing the feature as selectable if such feature is not excluded and not included.

4. The method of claim 3 further comprising:

providing a final configuration state when each feature is either included or excluded in the configuration state.

5. The method of claim 2 wherein (i) a set of the numerical clauses includes literals having respective weights and (ii) consuming literals and provider literals are respectively identified, and wherein updating the state of the configuration model further comprises:

representing a feature of the product as excluded if such feature is associated with one of the consumer literals from one of the numerical clauses whose weight is greater than the sum of uneliminated provider weights of such clause;

representing a feature of the product as included if such feature is associated with one of the provider literals from one of the numerical clauses if the weight of the provider literal is the only weight of provider literals in the clause that equals or exceeds the sum of the weights of consumer literals of the clause;

representing a feature of the product as selectable if such feature is associated with an only one of the provider literals having a weight that equals or exceeds a sum of one or more weights of consumer literals corresponding to one or more configuration choices.

6. The method of claim 1 wherein the predetermined state is a TRUE state.

7. The method of claim 1 wherein at least one number indicating a number of eliminable literals is a positive number greater than or equal to 2.

8. The method of claim 1 wherein the complement of the corresponding literal is a negation of the corresponding literal.

9. The method of claim 1 wherein each numerical clause is defined in the form of $\{E/a_1[w_1], a_2[w_2], \ldots a_n[w_n]\}$, wherein "$a_1, a_2, \ldots a_n$" represent literals of variables and may be positive or a negation, E is the maximum total weight that may be eliminated from the numerical clause for the numerical a clause to remain satisfiable, and $w_1, w_2, \ldots w_n$ are weights associated with each literal.

10. The method of claim 1 wherein each numerical clause is defined in the form of $\{M/a_1[w_1], a_2[w_2], \ldots a_n[w_n]\}$, wherein "$a_1, a_2, \ldots a_n$" represent literals of variables and may be positive or a negation, M is the minimum total weight that must be selected to satisfy the numerical clause, and $w_1, w_2, \ldots w_n$ are weights associated with each literal.

11. The method of claim 1 wherein at least one of the numerical clauses is a numerical clause having a minimum number of literals for satisfying one of the constraints, wherein the minimum number of literals for satisfying one of the constraints is a positive number greater than one and each of the numerical clauses is capable of being evaluated using an inference procedure.

12. The method of claim 11 further comprising:

representing one or more of the constraints as a clause having nested numerical clauses wherein at least one of the literals is a numerical clause having two or more literals.

13. The method of claim 11 wherein at least one of the constraints is a constraint that requires a choice of two or more literals when a first literal is selected, the method further comprising:

representing the constraint that requires the choice as a clause rc wherein one of the literals is a numerical clause having the two or more literals for satisfying the constraint, wherein the clause rc is capable of being evaluated using a numerical unit resolution inference procedure.

14. The method of claim 11 wherein the inference procedure is numerical unit resolution.

15. A method for configuring a product, the method comprising:

specifying a product definition, the product definition having one or more sets of elements, each set of elements associated with at least one of an include, exclude or required choice rule;

representing each rule as a numerical clause, wherein each numerical clause includes (i) a set of literals associated with features of the product and (ii) number indicating a number of eliminable literals that evaluate to a predetermined state for the numerical clause to be satisfied;

receiving user choices;

resolving the user choices and product definition using an inference procedure comprising:

determining one or more consequences of the choice using numerical unit resolution comprising:

asserting a literal corresponding to the configuration choice;

eliminating a literal that is a complement of the corresponding literal from every numerical clause containing the complement of the corresponding literal; and recursively asserting any literals in numerical clauses whose number of eliminable literals is zero;

determining a configuration state of the product from a result of the inference procedure; and configuring the product in accordance with the determined configuration state.

16. The method of claim 15 wherein each numerical clause includes a non-negative number indicating a minimum number of literals that evaluate to true for the clause to be satisfied.

17. The method of claim 15 further comprising:

defining a set of elements having an exclude relationship as a clause stated as a set of negative literals having a minimum of 1.

18. The method of claim 15 further comprising:

defining a set of elements having an include relationship as one or more numerical clauses, each numerical clause having one or more negative literals, one positive literal, and a minimum of one.

19. The method of claim 15 wherein the set of elements require a choice of a predetermined number of at least one element, the method further comprising:

defining a set of elements having a required choice relationship as a disjunction having a numerical clause with a minimum value equal to the predetermined number.

20. The method of claim 15 wherein the set of elements require a choice of at least a predetermined minimum number of elements and less than a predetermined maximum number of elements, the method further comprising:

defining a set of elements having a required choice relationship as first and second numerical clauses, each numerical clause having a minimum of at least one.

21. The method of claim 15 wherein the set of elements have a conditional relationship with a minimum of greater than one, the method further comprising:

defining a set of elements having a conditional relationship with a minimum greater than one as a nested numerical clause having at least one numerical clause stated as a literal within another numerical clause.

22. The method of claim 15 wherein resolving the user choices further comprises:
  combining the literals of the numerical clauses into a list;
  adding minimums of the numerical clauses;
  removing complementary literal pairs from the list; and
  reducing a sum of the added minimums for each complementary literal pair removed from the list.

23. The method of claim 15 wherein the product definition includes nested numerical clauses having an outer clause and an inner clause stated as a literal of the outer clause, and wherein resolving the user choices further comprises:
  positively asserting the outer clause at a configuration state; and
  asserting an inner clause by one or more of:
    positively asserting an inner clause as a minimum of the outer clause; and
    negatively asserting the inner clause as unsatisfiable.

24. The method of claim 23 wherein positively asserting an inner clause further comprises eliminating the literal of the outer clause to assert the inner clause to meet the minimum of the outer clause.

25. The method of claim 23 wherein negatively asserting an inner clause further comprises eliminating literals from the inner clause so that a number of literals of the inner clause is less than the minimum of the inner clause.

26. An article of manufacture comprising:
  a computer usable medium having computer readable program code embodied therein for configuring a product from multiple elements and a product definition of relationships between the elements, the computer usable medium comprising:
  computer readable program code configured to cause a computer to model the product configuration as conjunctions of numerical clauses, wherein each numerical clause includes (i) a set of literals associated with features of the product and (ii) number indicating a number of eliminable literals that evaluate to a predetermined state for the numerical clause to be satisfied;
  computer readable program code configured to cause a computer to receive a user feature choice;
  computer readable program code configured to cause a computer to generate a literal associated with the received user choice.
  computer readable program code configured to cause a computer to generate a state of the product configuration model using a numerical unit resolution between numerical clauses having a literal that is a complement of the literal associated with a received user choice;
  computer readable program code configured to cause a computer to assert a value for an element to the configuration model; and
  computer readable program code configured to cause a computer to determine a configuration state associated with the asserted value.

27. The article of manufacture of claim 26 wherein the computer readable program code configured to cause a computer to model the product configuration further comprises computer readable program code to model the product configuration as numerical clauses, each numerical clause stating one or more relationships for one or more elements by stating elements as literals and by stating a positive number indicating a number of true literals required to satisfy a numerical clause.

28. The article of manufacture of claim 27 wherein a set of the elements have an include relationship, the computer readable program code configured to cause a computer to model the product configuration further comprising computer readable program code to model the product configuration as one or more numerical clauses, each clause having one or more negative literals, one positive literal and a minimum of one.

29. The article of manufacture of claim 27 wherein a set of the elements have an exclude relationship, the computer readable program code configured to cause a computer to model the product configuration further comprising computer readable program code to model the product configuration as a clause stated as a set of negative literals having a minimum of 1.

30. The article of manufacture of claim 27 wherein a set of the elements have a choice relationship of a predetermined number of at least one element, the computer readable program code configured to cause a computer to model the product configuration further comprising computer readable program code to model the product configuration as a disjunction having a numerical clause with a minimum value equal to the predetermined number.

31. The article of manufacture of claim 27 wherein a set of the elements have a choice relationship of at least a predetermined minimum number of elements and less than a predetermined maximum number of elements, the computer readable program code configured to cause a computer to model the product configuration further comprising computer readable program code to model the product configuration as first and second numerical clauses, each numerical clause having a minimum of at least one.

32. The article of manufacture of claim 27 wherein the computer readable program code configured to cause a computer to model the product configuration further comprising computer readable program code to model the product configuration as first and second numerical clauses, the second numerical clause nested as a literal of the first numerical clause.

33. The article of manufacture of claim 27 wherein computer readable program code configured to cause a computer to state the product configuration model using a generalization of propositional logic unit resolution further comprises computer readable program code configured to cause a computer to combine the literals of the numerical clauses into a list, add the minimums of the numerical clauses, remove complementary literal pairs from the list, and reduce the sum of the added minimums for each complementary literal pair removed from the list.

34. A configuration system for configuring a product using a configuration model having a conjunction of numerical clauses representing configuration constraints, wherein each numerical clause includes (i) a set of literals associated with features of the product and (ii) a number indicating a number of eliminable literals that evaluate to a predetermined state for the numerical clause to be satisfied, the configuration system comprising:
  means for receiving a configuration choice; and
  means for determining one or more consequences of the choice using numerical unit resolution comprising:
    means for asserting a literal corresponding to the configuration choice;
    means for eliminating a literal that is a complement of the corresponding literal from every numerical clause containing the complement of the corresponding literal;

means for recursively asserting any literals in numerical clauses whose number of eliminable literals is zero;

means for generating a configuration of the product in accordance with the configuration choice and the determined one or more consequences of the configuration choice.

35. An article of manufacture comprising:

a computer usable medium having computer readable program code embodied therein for configuring a product using a configuration model having a conjunction of numerical clauses representing configuration constraints, wherein each numerical clause includes (i) a set of literals associated with features of the product and (ii) a number indicating a number of eliminable literals that evaluate to a predetermined state for the numerical clause to be satisfied, the computer usable medium comprising:

computer readable program code configured to cause a computer to receive a configuration choice;

computer readable program code configured to cause the computer to determine one or more consequences of the choice using numerical unit resolution, wherein the code to determine one or more consequences of the choice using numerical unit resolution comprises code configured to cause the computer to:

assert a literal corresponding to the configuration choice;

eliminate a literal that is a complement of the corresponding literal from every numerical clause containing the complement of the corresponding literal; and recursively assert any literals in numerical clauses whose number of eliminable literals is zero;

computer readable program code configured to cause the computer to generate a configuration of the product in accordance with the configuration choice and the determined one or more consequences of the configuration choice.

36. The article of manufacture of claim 35 further comprising computer readable program code to cause the computer to:

update a state of the configuration model to represent the one or more consequences after determining the one or more consequences of the choice.

37. The article of manufacture of claim 36 wherein a numerical unit clause is a clause whose number of eliminable literals is zero, and the computer readable program code to cause the computer to update the state of the configuration model further comprises computer readable program code to cause the computer to:

represent a feature of the product as excluded if such feature is associated with a numerical unit clause;

represent the feature as included if such feature is associated with a positive literal that exists in a numerical unit clause; and represent the feature as selectable if such feature is not excluded and not included.

38. The article of manufacture of claim 37 further comprising computer readable program code to cause the computer to:

provide a final configuration state when each feature is either included or excluded in the configuration state.

39. The article of manufacture of claim 36 wherein (i) a set of the numerical clauses includes literals having respective weights and (ii) consuming literals and provider literals are respectively identified, and wherein the computer readable program code to cause the computer to update the state of the configuration model further comprises computer readable program code to cause the computer to:

represent a feature of the product as excluded if such feature is associated with one of the consumer literals from one of the numerical clauses whose weight is greater than the sum of uneliminated provider weights of such clause;

represent a feature of the product as included if such feature is associated with one of the provider literals from one of the numerical clauses if the weight of the provider literal is the only weight of provider literals in the clause that equals or exceeds the sum of the weights of consumer literals of the clause;

represent a feature of the product as selectable if such feature is associated with an only one of the provider literals having a weight that equals or exceeds a sum of one or more weights of consumer literals corresponding to one or more configuration choices.

40. The article of manufacture of claim 35 wherein the predetermined state is a TRUE state.

41. The article of manufacture of claim 35 wherein at least one number indicating a number of eliminable literals is a positive number greater than or equal to 2.

42. The article of manufacture of claim 35 wherein the complement of the corresponding literal is a negation of the corresponding literal.

43. A computer system comprising:

a processor;

a memory coupled to the processor, the memory having information encoded therein to:

specify a product definition, the product definition having one or more sets of elements, each set of elements associated with at least one of an include, exclude or required choice rule;

represent each rule as a numerical clause, wherein each numerical clause includes (i) a set of literals associated with features of the product and (ii) number indicating a number of eliminable literals that evaluate to a predetermined state for the numerical clause to be satisfied; and cause the computer system to:

receive user choices;

resolve the user choices and product definition using an inference procedure comprising:

determining one or more consequences of the choice using numerical unit resolution comprising:

asserting a literal corresponding to the configuration choice;

eliminating a literal that is a complement of the corresponding literal from every numerical clause containing the complement of the corresponding literal; and recursively asserting any literals in numerical clauses whose number of eliminable literals is zero;

determine a configuration state of the product from a result of the inference procedure; and configure the product in accordance with the determined configuration state.

44. The computer system of claim 43 wherein each numerical clause includes a non-negative number indicating a minimum number of literals that evaluate to true for the clause to be satisfied.

45. The computer system of claim 43 wherein each set of elements associated with an exclude rule are defined using a clause stated as a set of negative literals having a minimum of 1.

46. The computer system of claim 43 wherein each set of elements associated with an include rule are defined using one or more numerical clauses, each numerical clause having one or more negative literals, one positive literal, and a minimum of one.

47. The computer system of claim 43 wherein each set of elements associated with a require a choice rule of a predetermined number of at least one element are defined using a disjunction having a numerical clause with a minimum value equal to the predetermined number.

48. The computer system of claim 43 wherein the set of elements require a choice of at least a predetermined minimum number of elements and less than a predetermined maximum number of elements, and the set of elements are defined as having first and second numerical clauses, each numerical clause having a minimum of at least one.

49. The computer system of claim 43 wherein the set of elements have a conditional relationship with a minimum of greater than one, and the set of elements are defined as having a conditional relationship with a minimum greater than one as a nested numerical clause having at least one numerical clause stated as a literal within another numerical clause.

50. The computer system of claim 43 wherein to resolve the user choices further comprises code to cause the computer system to:
   combine the literals of the numerical clauses into a list;
   add the minimums of the numerical clauses;
   remove complementary literal pairs from the list; and
   reduce a sum of the added minimums for each complementary literal pair removed from the list.

51. The computer system of claim 43 wherein the product definition includes nested numerical clauses having an outer clause and an inner clause stated as a literal of the outer clause, and wherein to resolve the user choices further comprises code to cause the computer system to:
   positively assert the outer clause at a configuration state; and
   assert an inner clause by one or more of:
      positively asserting an inner clause as a minimum of the outer clause; and
      negatively asserting the inner clause as unsatisfiable.

52. The computer system of claim 51 wherein positively asserting an inner clause further comprises eliminating the literal of the outer clause to assert the inner clause to meet the minimum of the outer clause.

53. The computer system of claim 51 wherein negatively asserting an inner clause further comprises eliminating literals from the inner clause so that a number of literals of the inner clause is less than the minimum of the inner clause.

54. A computer system comprising:
   a processor;
   a memory coupled to the processor, the memory having computer readable program code embodied therein for configuring a product using a configuration model having a conjunction of numerical clauses representing configuration constraints, wherein each numerical clause includes (i) a set of literals associated with features of the product and (ii) a number indicating a number of eliminable literals that evaluate to a predetermined state for the clause to be satisfied, the computer usable medium comprising:
      computer readable program code configured to cause a computer to receive a configuration choice;
      computer readable program code configured to cause the computer to determine one or more consequences of the choice using numerical unit resolution, wherein the code to determine one or more consequences of the choice using numerical unit resolution comprises code configured to cause the computer to:
         assert a literal corresponding to the configuration choice;
         eliminate a literal that is a complement of the corresponding literal from every numerical clause containing the complement of the corresponding literal; and
         recursively assert any literals in numerical clauses whose number of eliminable literals is zero;
      computer readable program code configured to cause the computer to generate a configuration of the product in accordance with the configuration choice and the determined one or more consequences of the configuration choice.

55. The configuration system of claim 34 further comprising:
   means for providing the configuration of the product to a client computer system.

* * * * *